(12) United States Patent
Nichols et al.

(10) Patent No.: US 7,764,365 B2
(45) Date of Patent: Jul. 27, 2010

(54) COMBINATION LASER DETECTOR AND GLOBAL NAVIGATION SATELLITE RECEIVER SYSTEM

(75) Inventors: Mark E. Nichols, Christchurch (NZ); Gary L. Cain, Springfield, OH (US); James M. Janky, Los Altos, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 529 days.

(21) Appl. No.: 10/898,156

(22) Filed: Jul. 23, 2004

(65) Prior Publication Data
US 2006/0279727 A1   Dec. 14, 2006

(51) Int. Cl.
G01C 1/00 (2006.01)
G01C 3/08 (2006.01)

(52) U.S. Cl. ............... 356/139.01; 356/5.01; 356/141.5
(58) Field of Classification Search ................. 356/3.1, 356/3.12, 5.01, 138, 139.1, 141.2–141.5, 356/622, 623
See application file for complete search history.

(56) References Cited

U.S. PATENT DOCUMENTS

| | | | |
|---|---|---|---|
| 5,100,229 A * | 3/1992 | Lundberg et al. | 356/3.12 |
| 5,268,695 A | 12/1993 | Dentinger et al. | |
| 5,600,436 A | 2/1997 | Gudat | |
| 5,652,592 A | 7/1997 | Sanderford et al. | |
| 5,935,194 A | 8/1999 | Talbot et al. | |
| 6,112,145 A | 8/2000 | Zachman | |
| 6,433,866 B1 * | 8/2002 | Nichols | 356/141.1 |
| 6,463,366 B2 | 10/2002 | Kinashi et al. | |
| 6,473,167 B1 * | 10/2002 | Odell | 356/141.4 |
| 6,480,152 B2 | 11/2002 | Lin et al. | |
| 6,563,574 B2 * | 5/2003 | Ohtomo et al. | 356/141.1 |
| 6,596,976 B2 | 7/2003 | Lin et al. | |
| 6,655,465 B2 | 12/2003 | Carlson et al. | |
| 6,704,619 B1 | 3/2004 | Coleman et al. | |
| 6,710,319 B2 | 3/2004 | Ohtomo et al. | |
| 6,782,644 B2 | 8/2004 | Fujishima et al. | |
| 6,947,820 B2 | 9/2005 | Ohtomo et al. | |
| 2002/0027007 A1 | 3/2002 | Ohtomo et al. | |
| 2002/0060788 A1 | 5/2002 | Ohtomo et al. | |
| 2002/0108761 A1 | 8/2002 | Ohtomo et al. | |
| 2003/0137658 A1 | 7/2003 | Ohtomo et al. | |
| 2004/0125365 A1 * | 7/2004 | Ohtomo et al. | 356/141.5 |
| 2005/0203701 A1 * | 9/2005 | Scherzinger | 701/207 |
| 2005/0242991 A1 * | 11/2005 | Montgomery et al. | 342/357.14 |
| 2006/0012777 A1 * | 1/2006 | Talbot et al. | 356/139.01 |

FOREIGN PATENT DOCUMENTS

| | | |
|---|---|---|
| EP | 1 434 029 A2 | 6/2004 |
| EP | 1 524 497 A1 | 4/2005 |

* cited by examiner

Primary Examiner—Isam Alsomiri
(74) Attorney, Agent, or Firm—Dinsmore & Shohl LLP

(57) ABSTRACT

A combination laser detector and global navigation satellite antenna has a laser detector positioned in a known and fixed relationship with the nominal phase center of an included global navigation satellite antenna. The offsets for these elements may be fixed, simplifying set up.

14 Claims, 5 Drawing Sheets

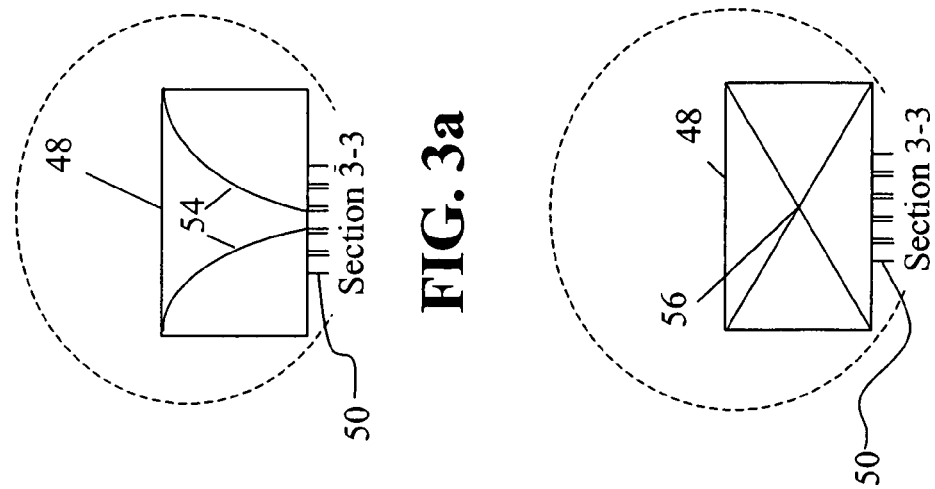
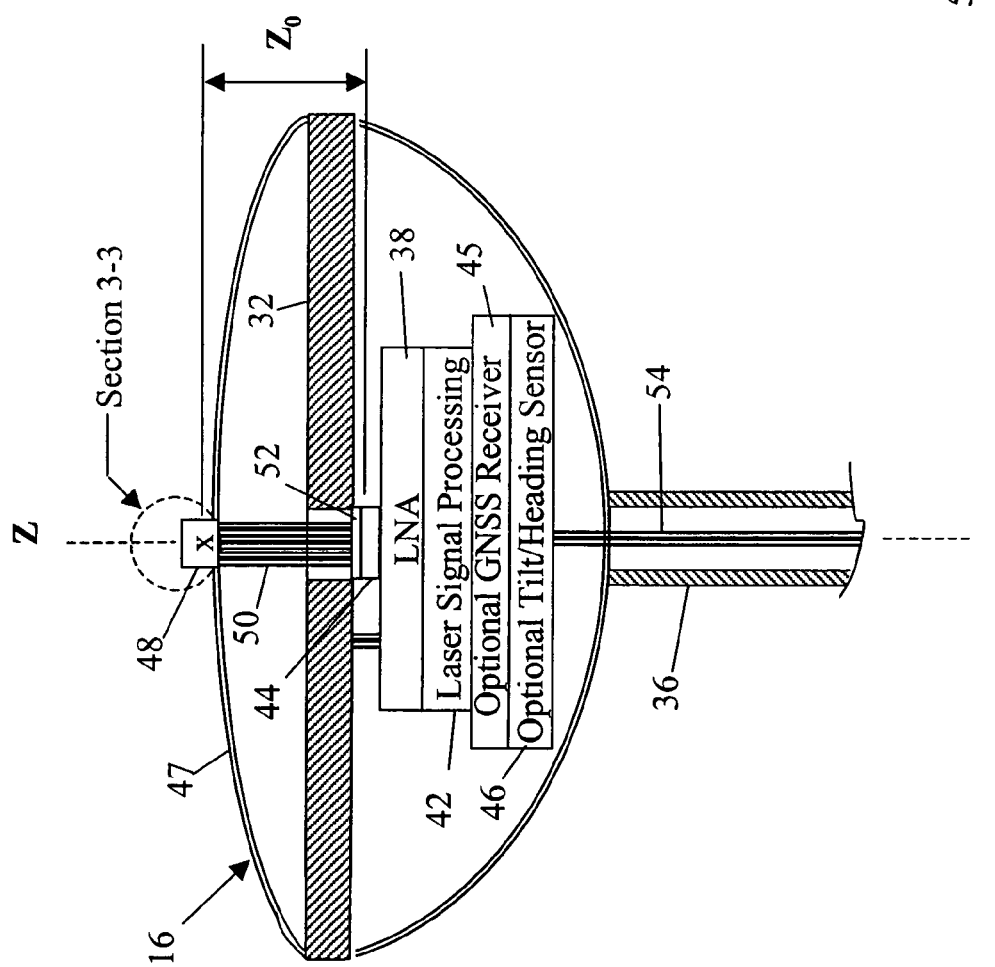

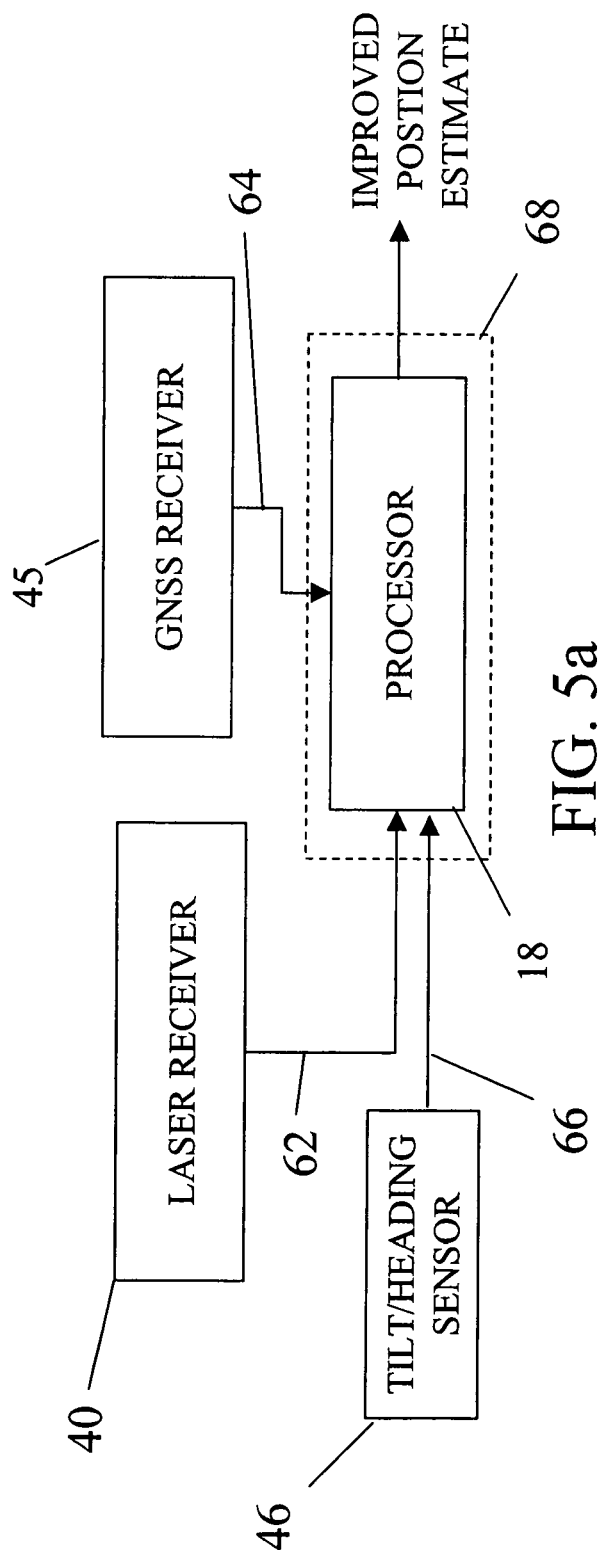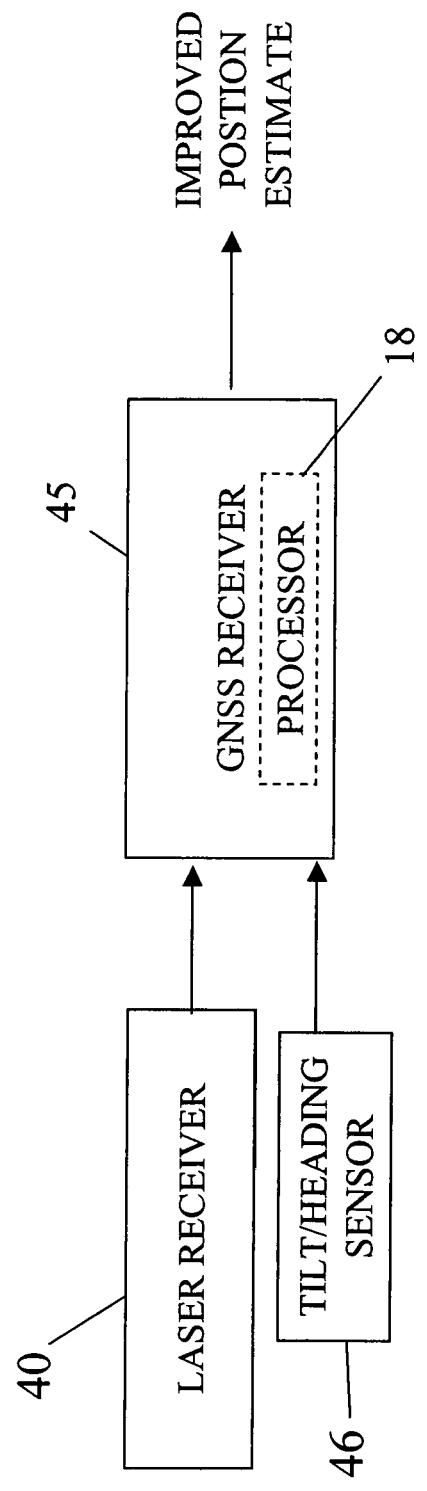

COMBINATION LASER DETECTOR AND GLOBAL NAVIGATION SATELLITE RECEIVER SYSTEM

BACKGROUND OF THE INVENTION

The current invention relates generally to position tracking and machine control systems, and in particular to a combination laser detector and global navigation satellite antenna useful in position tracking and machine control systems.

In prior art related to position tracking and machine control systems, global navigation satellite systems, like GPS and GLONASS have been used extensively to determine position coordinates facilitating automated control of a mobile unit. In the future, the European GALILEO system will have similar capabilities. An autonomous navigational system that includes a satellite receiver and a navigational computer can achieve a 10-meter level of accuracy in the position determination of a mobile unit using solely the satellite signals. Differential navigational systems that utilize differential corrections in addition to the satellite signals can determine the positional information to within a meter range of accuracy. Real-time kinematic (RTK) navigational systems that are capable of utilizing in real time not only code but also carrier information transmitted from the satellites can achieve centimeter level accuracy in the position determination of a mobile unit.

However, a level of accuracy under a centimeter is still beyond the reach of typical satellite-based navigational systems. In an attempt to achieve very high accuracy, prior art solutions have been to use rotating laser-based systems to define the plane level (Z-plane) to millimeter level accuracy. However, these prior art laser-based systems cannot be used for the purposes of three dimensional navigation of mobile objects because they are configured to determine only one (Z) coordinate of the mobile object with great accuracy. Improvements are therefore still needed in the art.

Complicating the effort to achieve millimeter level accuracy for all three coordinate positions (x, y, z) of a mobile unit is that a global navigation satellite receiver is typically designed to compute the location of its antenna. This means that in order to capture the location of an object of interest, an offset from the antenna's location must be applied to determine the horizontal (x, y) coordinates of the object of interest. An additional offset must also be applied to the location of the object of interest if a laser receiver is used to determine its vertical (z) coordinate. Typically, these offsets are manually entered into the control system and are based on manually measuring the locations of the antenna and laser receivers relative to the object of interest. For example, operators must manually measure the locations of the satellite antenna and laser receivers mounted separately on an excavator, to the excavator's bucket tip and enter those offsets into the excavator's control system. However, knowing precisely the offsets to be used for the satellite antenna and the laser receivers is an essential part of doing the most precise surveying possible. Manually taking and entering such measurements may introduce significant errors in the positional (x, y, z) computations performed by the control system in order to determine the location of an object of interest.

Additional errors may further creep into the positional (x, y, z) computation as global navigation satellite antennas are calibrated under somewhat ideal conditions. Typically, in situ calibrations are performed at a consistent height, and on flat terrain with no reflectors, other than the ground, that may cause unwanted multipath reflections leading to azimuthal asymmetries. Accordingly, for use at a construction site, the conditions under which these calibrations were determined are a somewhat unreasonable approximation of the actual conditions under which antennas are used at a construction site. Under ideal circumstances, every antenna would be individually calibrated at its own site. While this is possible and might be accomplished for permanent global navigation satellite tracking sites, it is impractical for sites that are only infrequently and briefly occupied, such as a plot of land being worked.

SUMMARY OF THE INVENTION

It is against the above mentioned background, that the present invention provides a number of unobvious advantages and advances over the prior art. In particular, the present invention discloses a combination laser detector and global navigation satellite antenna which is provided in a single package that allows a user to realize high precision control of mobile units, including high precision machine control.

With the combination laser detector and global navigation satellite antenna, the laser height reference detected by the laser detector is provided in a known and fixed relationship with the nominal phase center of the global navigation satellite antenna. In one embodiment, the phase center of the GPS antenna and an optical sensor of the laser detector are provided on the same plane, and in another embodiment, within a known and prescribed vertical and horizontal separation distance. Accordingly, the offsets for these elements are set by the manufacturer, alleviating users from setting up, measuring (and guessing), and entering the offset data between separate laser detectors and satellite antennas. Each mobile unit equipped with a combination laser detector and global navigation satellite antenna can use the fixed and known offset data to improve its position determination capabilities. An inclinometer may also be incorporated into the combination laser detector and global navigation satellite antenna to provide additional error correcting associated with any pitch and slope of the mobile unit or tool carried by the mobile unit. A heading indicating device may also be included for similar purposes.

BRIEF DESCRIPTION OF THE DRAWINGS

The aforementioned advantages of the present invention, as well as additional advantages thereof, will be more clearly understood hereinafter as a result of a detailed description of a preferred embodiment of the invention when taken in conjunction with the following drawings, wherein like elements are indicated by like symbols.

FIGS. 2-5b depict various embodiments of combination laser detector and global navigation satellite antennas according to the present invention.

DETAILED DESCRIPTION OF THE VARIOUS EMBODIMENTS

Figure 1:
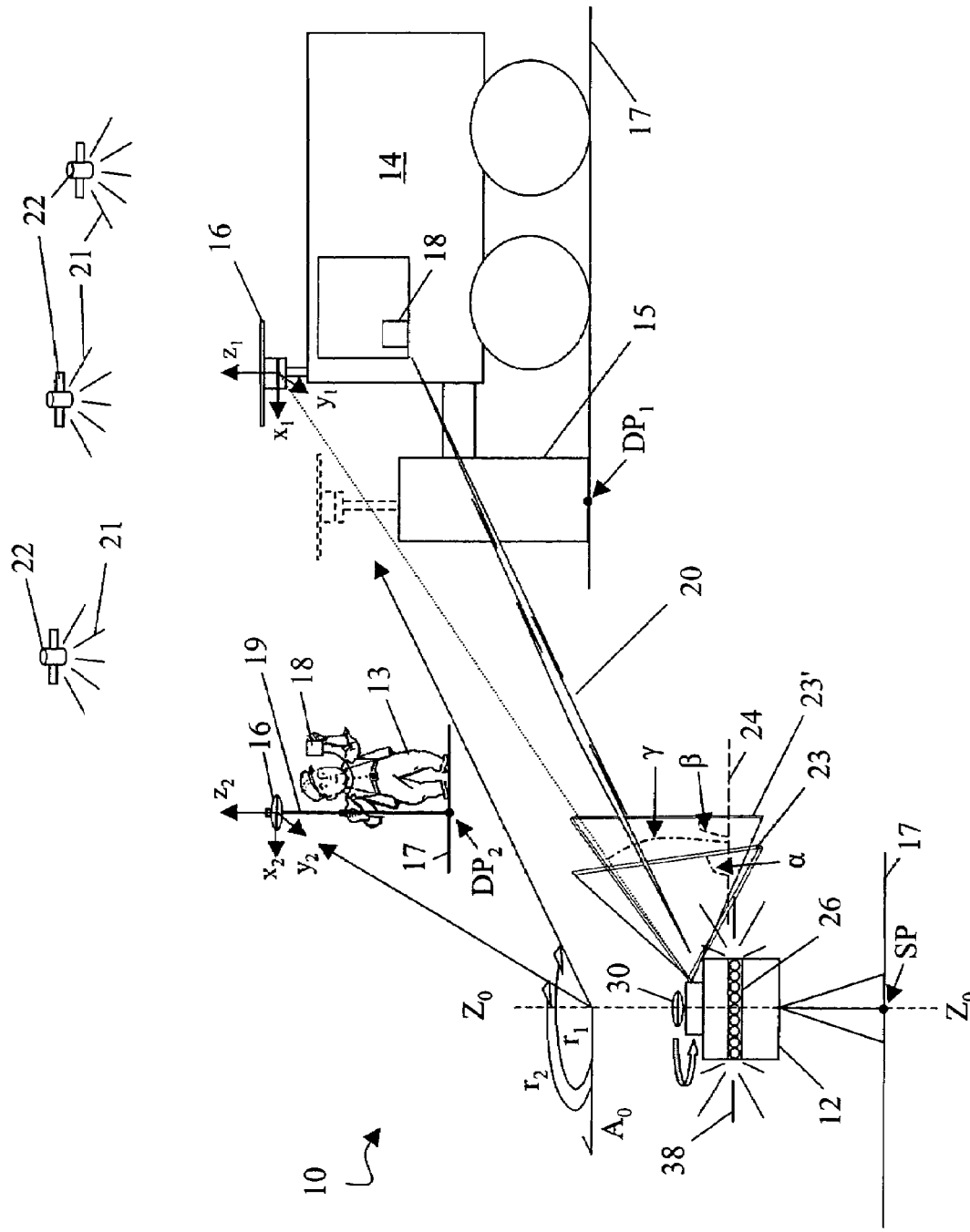
FIG. 1 shows a position tracking and control (PTC) system according to one embodiment of the present invention wherein the PTC system comprises a laser system, one or more mobile units, each having a combination laser detector and global navigation satellite (CLDGNS) antenna and an associated control system, and a communication link.

The present invention can be best understood by focusing on FIG. 1 that depicts a position tracking and control (PTC) system 10. The PTC system 10 comprises a laser transmitter system 12, one or more mobile units, such as a surveyor 13 or a machine 14, each having a combination laser detector and global navigation satellite (CLDGNS) antenna 16 and an associated processing unit 18, and having a transmitter for establishing a communication link 20, preferably a radio link. Signals 21 from a plurality of global navigation satellites 22 orbiting overhead, such as GPS, GLONASS, GALILEO, and combinations thereof, are received by the CLDGNS antenna 16 so that the coordinates of dynamic points in a plot of land 17, such as points indicated as $DP_1$ and $DP_2$, can be determined to a centimeter level of accuracy by the processing unit 18. As illustrated and for example, dynamic point $DP_1$ may be a working element 15 on the machine 14, such as a grader blade, while dynamic point $DP_2$ may be a point at the bottom of a manually positioned support 19, such as a pole, mast, tripod, and the like, being moved about by the surveyor 13.

In one embodiment, the CLDGNS antenna 16 and the associated processing unit 18 is provided as a man portable integrated positioning system (IPS). In such a man portable integrated positioning system embodiment, the CLDGNS antenna 16 is releasably mountable to the support 19 and interfaces with the processing unit 18 via a cable connection or a wireless connection. In such an embodiment, the processing unit 18 includes a microprocessor or other computing hardware configured to process data from the antenna 16 and to provide an estimate of the position of the antenna 16. In other embodiments, the processing unit 18, in addition to providing the features and advantages described herein, may either provide the capabilities of or interface with a conventional survey data collector, such as for example, but not limited to, Trimble's ACU Controller unit, Trimble's TSCe Controller unit, and Trimble's Recon Controller unit. Additionally, in another embodiment, the processing unit 18, in addition to providing the features and advantages described herein, may either provide the capabilities of or interface with a conventional GPS receiver. As such capabilities of a GPS receiver are well know to those skilled in the art, no further discussion is provided.

In other embodiments, the CLDGNS antenna 16 and the associated processing unit 18 may either provide the capabilities of or interface with a position tracking and machine control system for determining a three dimensional position of the machine 14 and/or the tool 15 carried by the machine. In one illustrative embodiment, the CLDGNS antenna 16 is mounted to the machine 14 and interfaces with the processing unit 18, being the position tracking and machine control system, via a cable connection or a wireless connection. In other embodiments, the processing unit 18, in addition to providing the features and advantages described herein, may either provide the capabilities of or interface with a conventional machine guidance and grade control unit, such as for example, but not limited to, Trimble's Sitevision GPS Grade Control System, and Trimble's BladePro 3D Machine Control System.

Millimeter level of accuracy in determining the position of the dynamic points $DP_1$ and $DP_2$ relative to each CLDGNS antenna 16 is provided by the processing unit 18 which uses information provided by the laser system 12 in its coordinate (x, y, z) position computation in addition to that from satellites 22. In one embodiment, the laser system 12 provides at least two diverging or fan-shaped beams 23 and 23' that rotate about a vertical axis $Z_0$ above a known stationary point SP in the plot of land 17. The fan-shaped beams 23 and 23' project from the laser system 12 in non-vertical planes, such that the first fan beam 23 will intersect an arbitrary horizontal reference plane 24 at an angle $\alpha$, and the second fan shaped beam 23' will intersect the horizontal reference plane at an angle $\beta$.

It is to be appreciated that the fan-shaped beams 23 and 23', if rotated at a constant speed about a vertical axis, will activate one after another (with some delay of time therebetween) at least one optical sensor 44 (FIGS. 2-4) of each CLDGNS antenna 16. Further, it is to be appreciated that in the shown embodiment of FIG. 1, the time delay between activating the optical sensor 44 by each fan-shaped beam 23 and 23' will increase or decrease as the relative position of a CLDGNS antenna 16 increases above or below the horizontal reference plane 24, respectively. It is to be appreciated that the CLDGNS antenna 16 can be initialized to any arbitrary horizontal reference plane 24 simply by selecting and entering into the processing unit 18 a detection time delay. Additionally, it is to be appreciated that any detected change by the CLDGNS antenna 16 in the detection time delay is related to an angle $\gamma$, which is the angle at which a straight line passing through the optical sensor 44 (FIGS. 2-4) of the CLDGNS antenna 16 and the point of emanation of the fan-shaped beams 23 and 23' meets the selected arbitrary horizontal reference plane 24.

As mentioned above, angles $\alpha$ and $\beta$ are constants. Angle $\gamma$ is determined by sensing the timing between the illumination of the sensor 44 by the beams 23 and 23'. The higher the sensor 44, the greater the delay. It will be apparent that fluctuation in the rotation speed of the fan-shaped beams 23 and 23' will introduce short term, transient errors. To minimize such errors, the processing unit 18 may be provided with the rotation speed of the laser system 12 via the communication link 20. The rotation speed may, however, be phase locked to a crystal oscillator, providing sufficient accuracy. Accordingly, knowing the rotation speed, the processing unit 18 can compute the value of angle $\gamma$ arithmetically from the detected time delay between illumination by the beams 23 and 23', and thus the elevation angle of the optical sensor in the CLDGNS antenna 16 above the reference horizontal plane 24 is determined.

In another embodiment, the laser system 12 is further provided with a plurality of light sources which are strobed at the same point in time during each rotation of the beams 23 and 23' Beacon 26 provides a simultaneous 360° flash 38 at a different wavelength than the fan shaped beams 23 and 23'. By orientating the laser system 12 such that the beacon 26 flashes as the mid point between the fan-shaped beams 23 and 23' passes a known true heading $A_0$, the processing unit 18 can also compute a relative bearing to the laser system 12 from the time delay between detecting the signal 38 of the beacon and detecting the fan-shaped beams 23 and 23'.

In still another embodiment, the laser system 12 is provided with a global navigation satellite system (GNSS) receiver 30. The GNSS receiver 30 can receive and compute its position from the signals 21 provided by the global navigation satellites 22. A detailed discussion of how to determine a location from such signals is disclosed by U.S. Pat. No. 6,433,866, also assigned to Trimble Navigation, LTD, the disclosure of which is herein incorporated fully by reference.

The processing unit 18 in addition to knowing its own position (as computed from the detected satellite signals received and provided by the CLDGNS antenna 16), is provided also with the known and fixed position of the laser system 12 via the communication link 20. Using the information provided by the laser system 12 for correlation and error correcting, the processing unit 18 can then computer the coordinate (x, y, z) position of any dynamic point relative to the CLDGNS antenna 16 to a degree of accuracy under a centimeter. A more detail discussion of the computations performed by the processing unit 18 is disclosed by co-pending U.S. application Ser. No. 10/890,037, entitled "COMBINATION LASER SYSTEM AND GLOBAL NAVIGATION SATELLITE SYSTEM", published as Pub. No. US-2006-

0012777-A1, also assigned to Trimble Navigation Limited, the disclosure of which is herein incorporated fully by reference.

It is to be appreciated that the PTC system 10 provides a number of benefits to a potential mobile user by integrating a laser detector and a global navigation satellite antenna. For example, the CLDGNS antenna 16 costs less than separate laser detectors and global navigation satellite antennas because the integrated CLDGNS antenna requires only one set of packaging, and can utilize shared circuitry and wiring, computer memory and processing, and a common power supply. Other benefits are disclosed with reference made to FIGS. 2-5 which illustrate various embodiments of the combination laser detector and global navigation satellite antenna according to the present invention.

Figure 2:
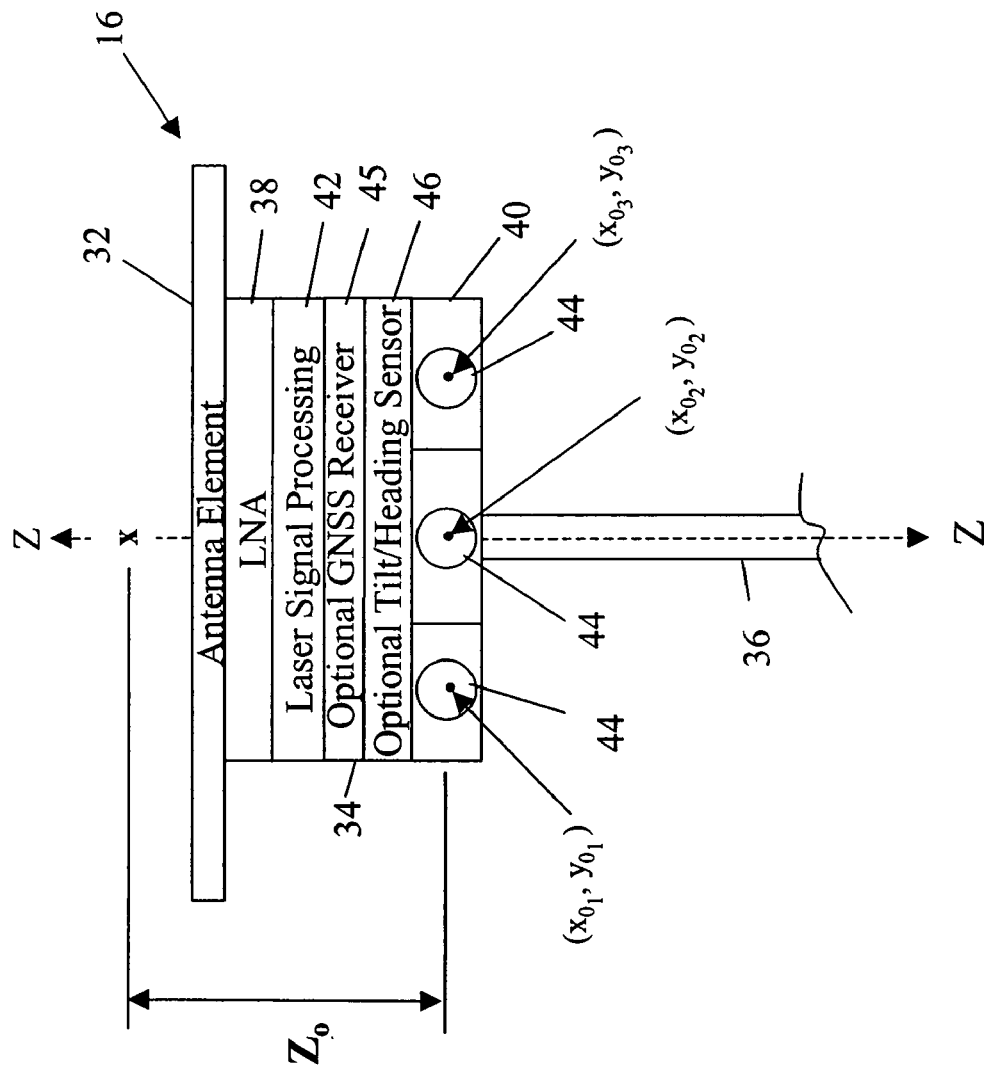

FIG. 2 illustrates diagrammatically one embodiment of a CLDGNS antenna 16 which provides an antenna element 32 mounted to an electronic housing 34, which in turn is mounted to an end of an elongated support 36, such as a mast. Within the housing 34, the antenna element 32 is coupled to a low noise amplifier (LNA) 38, and a laser detector 40 is coupled to a laser signal processor 42. The laser detector 40 may include a number of optical sensors 44 placed around the periphery of the housing 34. In one embodiment, the optical sensors 44 face generally downward and outward. In this orientation, at least one of the optical sensors 44 will detect the fan-shaped beams 23 and 23' from the laser system 12, and two or more optical sensors 44 will detect the fan-shaped beam some of the time. Each optical sensor 44 can be read independently and its position calculated by the processing unit 18.

In the illustrated embodiment of FIG. 2, the relative positions $X_0$, $Y_0$, and $Z_0$ of each optical sensor 44 to the nominal phase center x of the antenna element 32 is known and fixed. Accordingly, transposing the detected laser position of each optical sensor 44 to the nominal phase center x of the antenna element 32 is easily computed arithmetically by the processing unit 18.

The difference in the detected elevation between the three optical sensors 44 provides an indication of tilt, which in turn may be used by the processing unit 18 to compensate for errors that would otherwise result in the calculated position of $DP_1$ and $DP_2$. Additionally, although the antenna tilt angle is important for adjusting the detected laser heights of each optical sensor 44 to the nominal phase center x of the associated antenna element 32, these changes in detected laser heights can also be used to help determine the orientation of the device (such as a grader/bulldozer blade) to which the CLDGNS antenna 16 may be connected. However, if desired, a tilt/heading sensor 46 may be further included in the packaging of the CLDGNS antenna 16 to simplify further the compensation for tilt, error correcting, and device orientation determination.

In another embodiment of the CLDGNS antenna 16, illustrated by FIG. 3, the electronic housing 34 and the antenna element 32 are protected by a housing or radome 47. A fiber optic pick-up 48 of the laser detector is positioned on the top of the radome 47. The fiber-optic pick-up 48 is small, about 0.25 inches (6 mm) in diameter, as it only needs to collect enough energy to activate the optical sensor 44. The non-metallic fiber optic pick-up 48 is orientated along the Z axis, aligned vertically with the nominal phase center x of the antenna element 32. The laser detector also includes optical fiber 50 coupling the fiber optic pick-up 48 to the optical sensor 44. In this embodiment, the optical sensor 44 is positioned below the antenna element 32. A filter 52 may be optionally provided to filter out light noise received by the fiber optic pick-up 48. This improves the sensitivity of the optical sensor 44 to the energy of the fan-shaped beams 23 and 23' (FIG. 1).

In one embodiment, the fiber optic pick-up 48 comprises a circularly symmetric hyperbolic mirrored surface 54 (FIG. 3a) that catches light from 360 degrees, and reflects it to the optical sensor 44, via the optical fibers 50. In another embodiment, the fiber optic pick-up 48 may comprises a TIR prism 56 (FIG. 3b) which redirects the laser energy to the optical sensor 44, via optical fiber 50. The use of a total internal reflection (TIR) prism 56 requires no metallic coatings to ensure reflectivity, thereby removing all metal from above the antenna element 32. Since the metallic and semi-metallic portions of the optical sensor 44 are located below the antenna element 32, they will not adversely affect the ability of the antenna 16 to pick up the relatively weak satellite signals 21. Cabling 58 is provided through the support 36 to connect the output of the CLDGNS antenna 16 to the processing unit 18 (FIG. 1).

In yet another embodiment, illustrated by FIG. 4, one or more sensors 60 are located below the electronics housing 34, spaced along the support 36. This arrangement for the sensors 60 has the advantage of not interfering whatsoever with the antenna's reception, and also does not affect the location of the nominal phase center x of the antenna element 32. Each sensor 60 may comprise a circularly symmetric hyperbolic mirrored surface or a prism. Because each sensor 60 is below the antenna element 32, fiber optics may not be required since the sensors may be integrated closely with the detectors. A filter 52 may be provided to filter out extraneous energy to improve sensitivity to laser light. The output signals from the detectors in all the above disclosed embodiments are coupled to associated processors 42. The output of processor 42 is included in the output of the CLDGNS antenna 16 and provided to the processing unit 18 for further use and evaluation.

Figure 4:
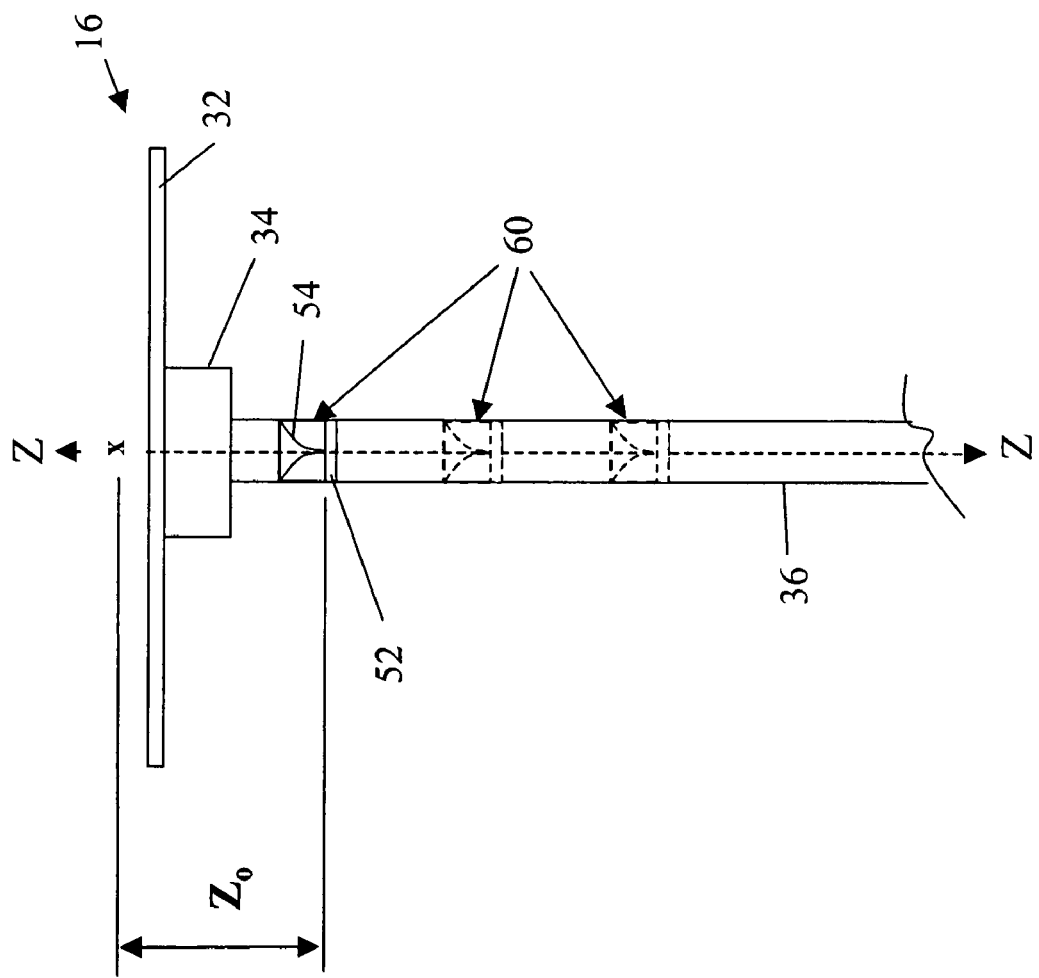

In the embodiment of FIG. 4, the sensors 60 may be provided at precisely known positions along the support 36. Information provided by the sensors 60 can be used by the processing unit 18 to determine the distance from the transmitter 12 to the sensors 60. Since computation is well know to those skilled in the art, no further discussion is provided. This coaxial alignment simplifies implementation though non-coaxial implementations are also possible.

In the above disclosed embodiments of the CLDGNS antenna 16 (FIGS. 1-4), each of the laser detectors and the nominal phase center x of the antenna element are separated by a known and fixed spatial difference. In one embodiment, the laser detectors and the nominal phase center x of the antenna element are aligned generally in the same plane, and in another embodiment, are aligned either co-axially or within a known and prescribed vertical and horizontal separation. In particular, the $Z_0$ distance (and the $X_0$, $Y_0$ distances, if necessary) of each optical sensor 44 relative to the nominal phase center x of the antenna element 32 are factory set. Accordingly, the CLDGNS antenna 16 improves the accuracy of the PTC system 10 by preventing an operator from manually entering a positional error into processing unit 18 due to a miscalculated measurement between the optical sensors of the laser detector and the nominal phase center x of the antenna element, which have been separately placed and mounted relative to each other by the operator. For further convenience, the offset data can be automatically entered into the control system as part of the control system's set-up procedure, if desired.

In all the above embodiments, the CLDGNS antenna 16 is illustrated as having either a geodesic or generally flat disc shape. However, it is to be appreciated that other satellite antennas may also be used advantageously with the concepts of the present invention.

Finally, with reference to FIGS. 5a and 5b, embodiments of an improved position estimating system provided by the CLDGNS antenna 16 are illustrated and showing the interface of data streams provided by the CLDGNS antenna 16 to the processing unit 18. In one embodiment, the processor unit or processor 18 is provided separately from the laser receiver 40, GNSS receiver 45, and optional tilt and/or heading sensor 46, wherein their associated data streams 62, 64, and 66, respectively, are inputted remotely (wired or wireless) to the processor 18 as depicted by FIG. 5a. In the embodiment depicted by FIG. 5b, the processor 18 is part of the GNSS receiver 45, wherein the data streams from the laser receiver 40, and optional tilt and/or heading sensor 46 are inputted remotely to the processor 18. Accordingly, it is to be appreciated that the processor or processing unit 18 can be part of a GPS receiver, or other device 68 such as for example, a position tracking and machine control system, a machine guidance and grade control unit, or it can be a separate unit either providing the capabilities of or interfacing with such devices, units, and systems.

Generally, the GNSS receiver 45 is configured to provide a first data element in the data stream 62 relating to a first position estimate of the antenna phase center X of antenna element 32 (FIG. 2-4). The laser receiver 40 provides a second data element in the second data stream 64 from an optical sensor, which is provided at a known position fixed relative to the antenna phase center, and which is associated with the first position estimate. With the first and second data elements the processor 18 can compute and provide a second position estimate. As such computations are explained in greater detail in the above mentioned co-pending application, no further discussion is provided.

Although the present invention has been described in terms of the presently preferred embodiments, it is to be understood that the disclosure is not to be interpreted as limiting. Various alterations, modifications, and combinations thereof will no doubt become apparent to those skilled in the art after having read the above disclosure. Accordingly, it is intended that the appended claims be interpreted as covering all alterations and modifications as fall within the true spirit and scope of the invention.

What is claimed is:

1. A man portable integrated system for determining the position of an object of interest in each of three coordinates in a three-dimensional coordinate system by detecting at least two fan-shaped beams oriented at differing angles and rotated about a common axis and by detecting signals from a global navigation satellite system, comprising:

a combination laser detector and global navigation satellite antenna having an antenna element with a nominal phase center orientated along a first axis, said antenna element being adapted to receive signals from a global navigation satellite system, and having at least one optical sensor also oriented along said first axis a predetermined distance from said antenna element, said optical sensor being adapted to respond to the fan-shaped lasers beams;

a support for supporting said combination laser detector and global satellite antenna; and a processing unit adapted to use information provided by said combination laser detector and global navigation satellite antenna to determine the three dimensional position of the object of interest, said processing unit using information provided from said laser detector to determine each of the three coordinates, and said processing unit using information from said global navigation satellite antenna to determine each of the three coordinates.

2. A man portable integrated system according to claim 1 wherein said processing unit is adapted to provide capabilities of a survey data collector.

3. A man portable integrated system according to claim 1 wherein said processing unit is adapted to interface with a survey data collector.

4. A man portable integrated system according to claim 1, further comprising a low noise amplifier coupled to said antenna element for processing received signals.

5. A man portable integrated system according to claim 1, further comprising a processor coupled to said at least one optical sensor for processing output signals from said optical sensor produced in response to illumination by the fan-shaped beams.

6. A man portable integrated system according to claim 1, further comprising a tilt sensor associated with said combination laser detector and global navigation satellite antenna.

7. A man portable integrated system according to claim 1, further comprising a heading sensor associated with said combination laser detector and global navigation satellite antenna.

8. A man portable integrated system according to claim 1, wherein said at least one optical sensor is located below said antenna element.

9. A man portable integrated system according to claim 1, wherein said at least one optical sensor is mounted on said support below said antenna element.

10. A man portable integrated system according to claim 1, comprising three optical sensors.

11. A man portable integrated system according to claim 1, further comprising an optical fiber coupling a non-metallic fiber optic pick-up to said optical sensor.

12. A man portable integrated system according to claim 1, further comprising a filter to improve the sensitivity of said optical sensor to the energy of the fan-shaped beams.

13. A man portable integrated system according to claim 1, further comprising an optical fiber coupling a non-metallic fiber optic pick-up to said optical sensor, and wherein said optical pick-up comprises a circularly symmetric hyperbolic mirrored surface.

14. A man portable integrated system according to claim 1, further comprising an optical fiber coupling a non-metallic fiber optic pick-up to said optical sensor, and wherein said optical pick-up comprises a total internal reflective prism.

* * * * *